(12) United States Patent
Hall et al.

(10) Patent No.: US 6,249,142 B1
(45) Date of Patent: Jun. 19, 2001

(54) DYNAMICALLY TERMINATED BUS

(75) Inventors: Stephen H. Hall, Hillsboro; Maynard C. Falconer, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,966

(22) Filed: Dec. 20, 1999

(51) Int. Cl.[7] .................................................... H03K 17/16
(52) U.S. Cl. ................................................. 326/30; 326/86
(58) Field of Search ................................. 326/30, 83, 86, 326/26, 87; 327/108, 107

(56) References Cited

U.S. PATENT DOCUMENTS 5,821,767 * 10/1998 Osaka et al. ............................ 326/30
6,023,181 * 2/2000 Penny et al. ........................... 327/291
6,040,714 * 3/2000 Klein ....................................... 326/30
6,097,208 * 8/2000 Okajima et al. ........................ 326/30

\* cited by examiner

Primary Examiner—Michael Tokar
Assistant Examiner—Don Phu Le
(74) Attorney, Agent, or Firm—Kenyon & Kenyon

(57) ABSTRACT

A Dynamically Terminated Bus (DTB) comprising a transmission line coupled to a plurality of dynamically configurable components and a bus protocol that only permits a single component to transmit at a time. Each of the dynamically configurable components can be configured as a single unbalanced complementary metal-oxide-semiconductor (CMOS) pull-up driver and a gunning transceiver logic (GTL) on-die, pull-up termination receiver. However, only one dynamically configurable component can be configured as the CMOS pull-up driver at a time. Embodiments of the present invention provide a high speed, DTB for coupling to the components.

23 Claims, 6 Drawing Sheets

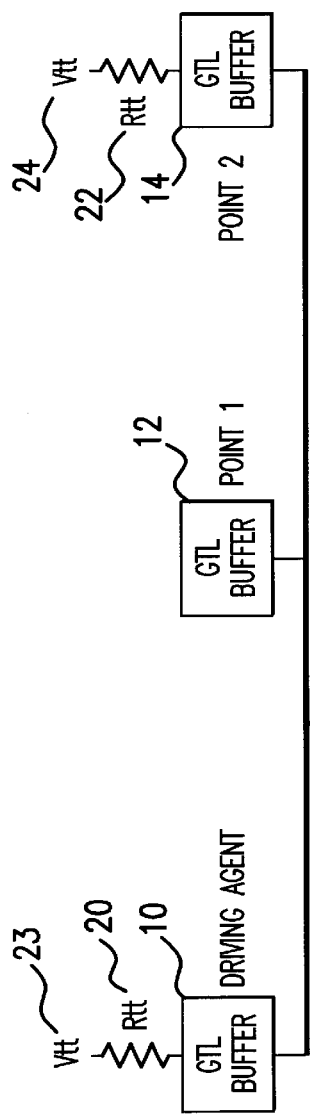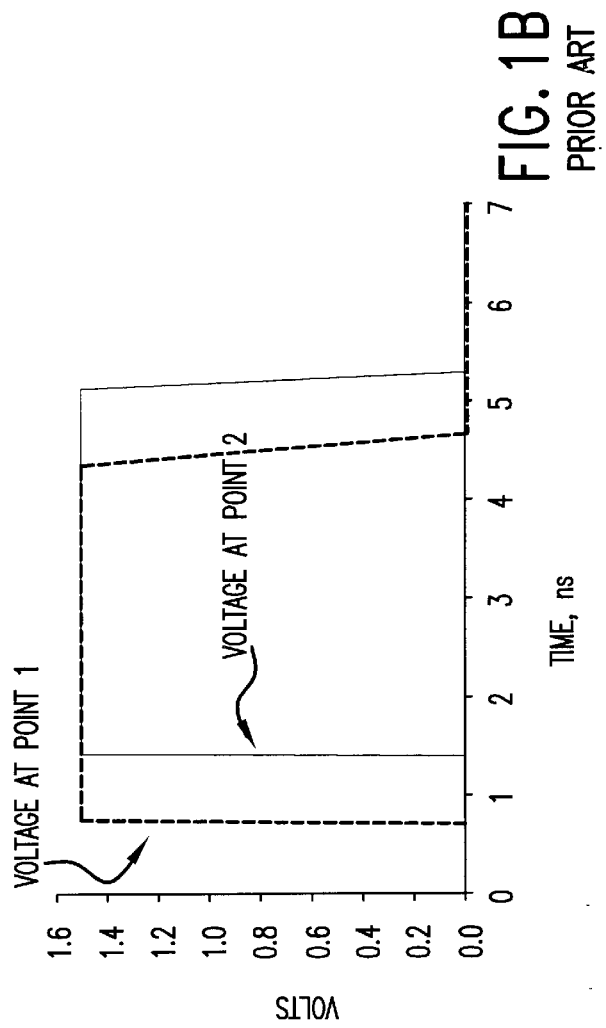

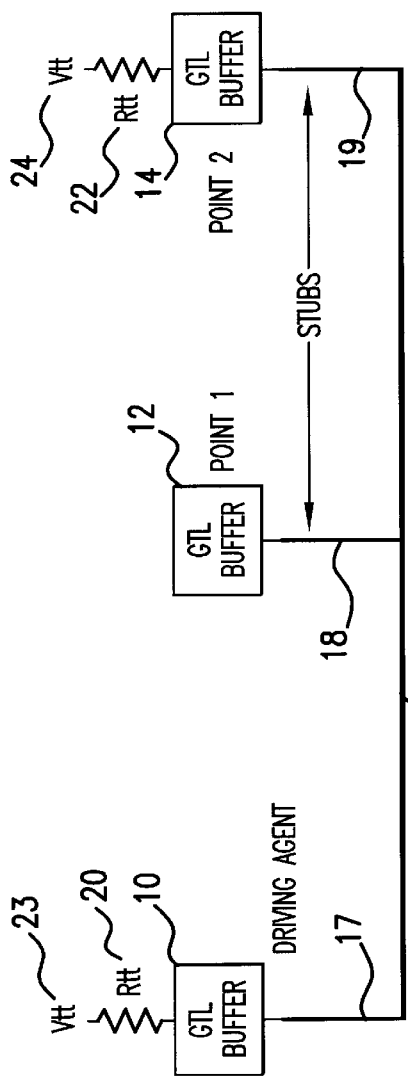
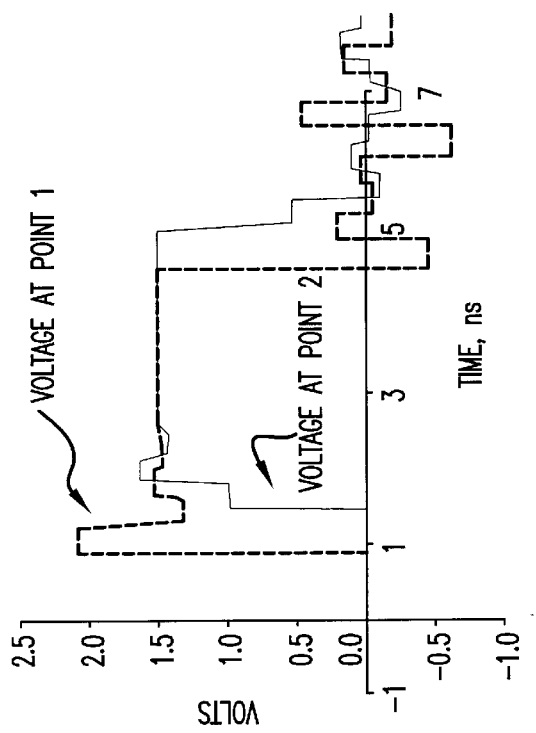
FIG. 2A PRIOR ART
FIG. 2B PRIOR ART

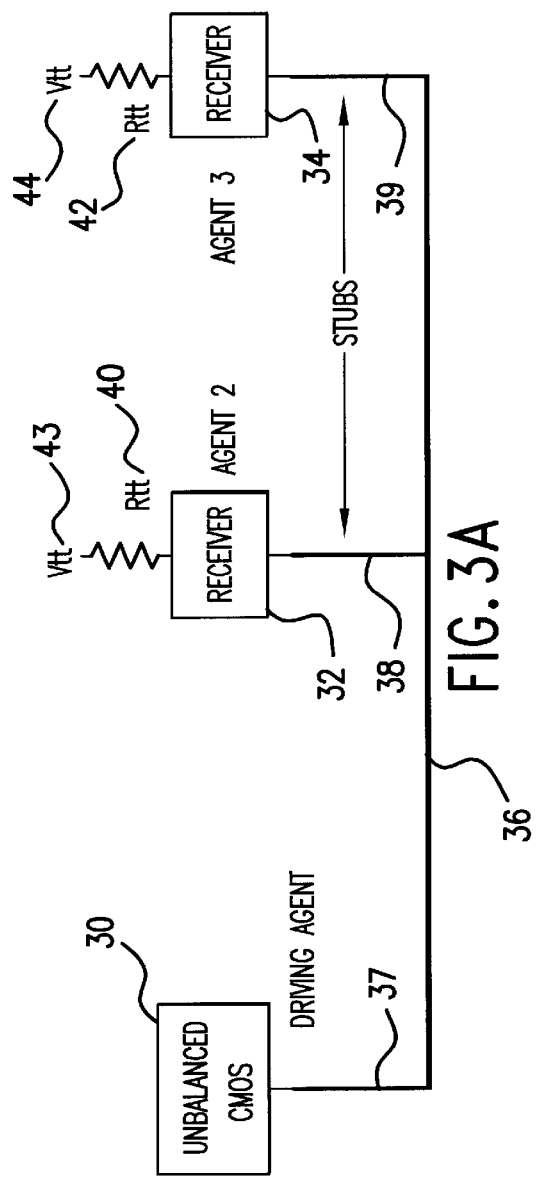
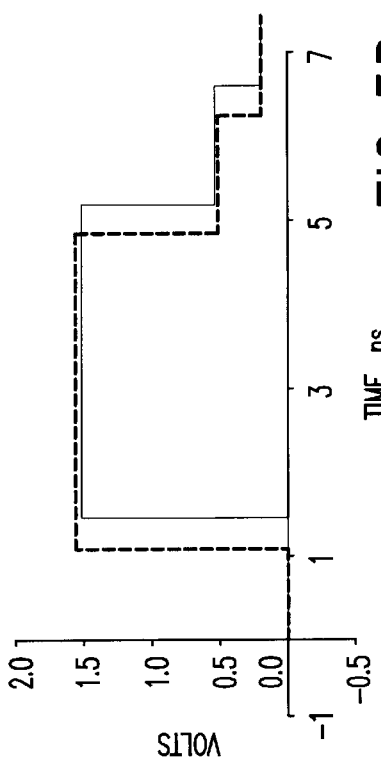
FIG. 3A
FIG. 3B

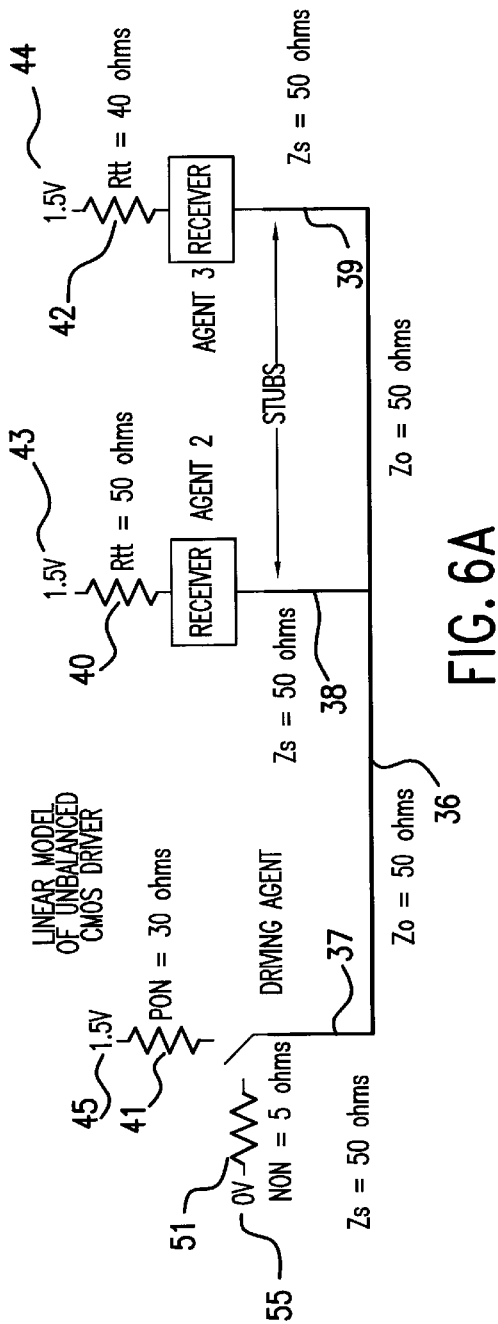
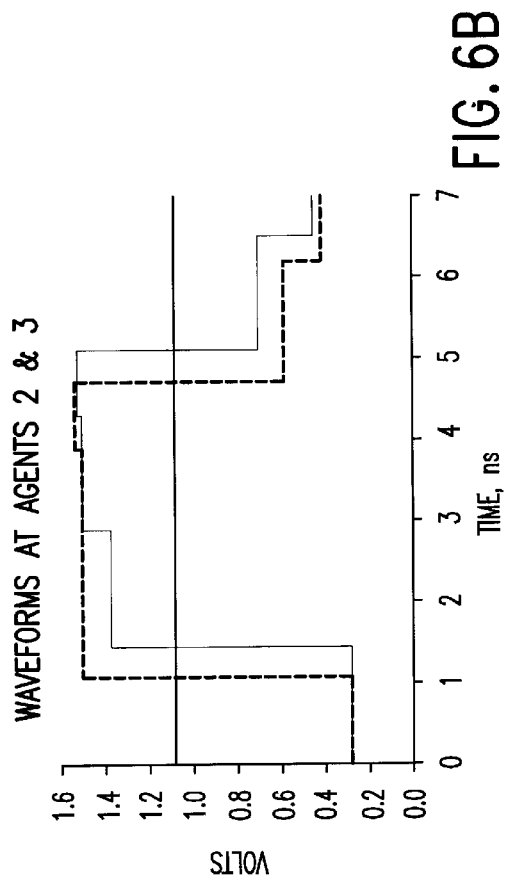
FIG. 6A
FIG. 6B

DYNAMICALLY TERMINATED BUS

FIELD OF THE INVENTION

The present invention relates to a Dynamically Terminated Bus ("DTB") that compensates for severe signal integrity problems in traditional multi-drop digital buses.

BACKGROUND

The major performance bottlenecks inherent in Gunning Transceiver Logic ("GTL") bus designs are well known. As a result, as bus speeds continue to increase, the traditional GTL bus solutions will begin to fail. This is especially true in high speed, multi-processor designs. These failures are inevitable due to the inherent nature of the GTL bus topology. Ideally, a GTL bus is just a long transmission line, with terminations on each end that are pulled up to a Termination Voltage source ("Vtt"). The I/O buffers are then simply coupled directly to the transmission line. In reality, however, each buffer is coupled to the transmission line via a stub. The total stub length can be comprised of several components, such as the chip package, the Printed Circuit Board ("PCB"), a cartridge trace or an interposer. The stubs introduce signal integrity variations and cause timing pushouts. If, however, the stub is short enough so that the timing pushouts are small compared to the available margin, then the timing impact can be tolerated. The problem is that bus speeds are increasing to the point that even short stub lengths are beginning to significantly degrade bus performance.

The inherent signal integrity problems in a GTL bus are caused by the impedance discontinuity of the stub. FIG. 1A depicts the circuit topology of an ideal GTL bus with no stub and FIG. 2A depicts a realistic GTL topology with a 1" long stub. FIG. 1B shows the ideal waveforms produced by the circuit in FIG. 1A. In contrast, in FIG. 2B, which shows the waveforms produced by the circuit in FIG. 2A, notice the ledges on the rising and falling edges of the second waveform seen at point 2. The timing impacts mentioned above are a direct result of this ledge. If the threshold voltage of a particular buffer is slightly below the ledge and the threshold voltage of another buffer in the same data word is slightly above the ledge, then this introduces a huge amount of timing skew into the system. Furthermore, parasitic inductances and impedance discontinuities may cause the ledge to ring above and below a threshold, which may cause a false trigger of the receiver. For example, if the signal is a clock, the false trigger could cause a system wide failure or, if the signal is on a data line, the false trigger could cause the wrong information to be received.

In FIG. 1A, driving agent 10 is pulled up to a Vtt 23 via an on-die termination resistance ("Rtt") 20 and driving agent 10 is directly coupled to transmission line 16. Point 2 14 is similarly pulled up to Vtt 24 via Rtt 22 and point 2 14 is directly coupled to transmission line 16. Point 1 12 is also directly coupled to transmission line 16.

In FIG. 2A, driving agent 10, point 1 12 and point 2 14 are each configured as in FIG. 1A, with the exception that each is now coupled to transmission line 16 by stubs 17, 18 and 19, respectively.

The Magnitude of the timing impact is a function of the stub length. In both FIG. 1A and FIG. 2A, the approximate timing impact ("$T_{impact}$") seen at point 2 14 when driving agent 10 is driving the bus is shown by equation (1).

$$T_{impact} \approx (2)Length_{stub}\left(\frac{\sqrt{Er}}{c}\right) \quad (1)$$

Where Er is the dielectric constant that the stub is routed through, c is the speed of light in a vacuum and $Length_{stub}$ is the length of the stub. The timing impact is due to the round trip delay of the signal traveling the length of the stub and being reflected back to the bus.

For example, in FIG. 2B, the 1.0" length of stub 17 in FIG. 2A introduces approximately a 300 picosecond ("ps") timing impact, and, in today's high-speed systems, this constitutes more than 100% of the total allowed flight time skew. The voltage level at which the shelf occurs ("$V_{shelf}$") is dependent on the characteristic impedance of the transmission line ("$Zo_{pcb}$") and the characteristic impedance of the stub ("$Zo_{stub}$"). Equation (2) is used to approximate the level at which the shelf will occur on the rising edge.

$$V_{shelf} = V_{tt}\left(1 + \frac{(Zo_{stub}\|Zo_{pcb}) - Zo_{pcb}}{(Zo_{stub}\|Zo_{pcb}) + Zo_{pcb}}\right) \quad (2)$$

For realistic ranges of the stub and PCB impedances, this shelf will always be within the threshold range of the buffer for the traditional GTL solution. For example, the traditional GTL solution works with designs such as the Pentium II and other processors which operate at slow enough frequencies so that the excess timing impact due to the stubs can be tolerated. In contrast, the margins in the new high-speed processor designs are too small and the extra timing impact due to the stubs severely breaks the design. In addition, the signal integrity problems caused by the un-terminated stubs exacerbate the inter-symbol interference ("ISI").

A common belief is that the timing problems associated with stubs on a GTL bus can be compensated for by slowing the edge rates to mask the signal integrity problem. In the slower system designs of the past, this may have been a viable option. In fact, even in today's high-speed designs, some small signal integrity problems may still be masked by slower edge rates. However, this option is not a practical overall design practice, since slower edge rates always translate into increased timing uncertainty. Furthermore, slowing the edge rate is just a temporary patch. As system performance increases and timing budgets decrease, slowing edge rates will cease to be an option due to the timing uncertainty introduced by threshold variation and jitter.

As a result of system bus speeds constantly increasing, traditional GTL and other lower performance bus designs will no longer work. For example, future high speed systems will not work with a traditional GTL bus due to the long stub lengths and associated timing delays introduced by the chip package and the interposer. In the near future, there will be two alternatives for solving the signal integrity problems introduced by stubs. The first alternative is a flow-through chip package that eliminates the stub, unfortunately, this design is very expensive. The second alternative is a different bus design which allows the stubs to be present on the bus. The second alternative minimizes cost and increases performance.

Therefore, an inexpensive and efficient alternative to a GTL bus that helps eliminate the timing pushouts due to the signal integrity problems associated with the traditional GTL topology is needed.

SUMMARY OF THE INVENTION

Embodiments of the present invention provide an apparatus for implementing a high speed digital interface using a dynamically terminated bus ("DTB") coupled to a plurality of components and a dynamically terminated bus protocol operating to control access to the DTB by the plurality of dynamically configurable bus components.

BRIEF DESCRIPTION OF THE DRAWINGS

The various features of the invention will best be appreciated by simultaneous reference to the description which follows and the accompanying drawings, in which:

FIG. 1A is a simplified circuit topology of an ideal GTL bus with no stubs between the transmission line and the GTL buffers.

FIG. 1B shows the waveforms at points 1 and 2 of FIG. 1A.

FIG. 2A is a simplified circuit topology of a GTL bus with stubs between the transmission line and the GTL buffers.

FIG. 2B shows the waveforms at points 1 and 2 of FIG. 2A.

FIG. 3A is a simplified circuit topology of an embodiment of the dynamically terminated bus showing the first agent as the driving agent.

FIG. 3B shows the waveforms at agents 2 and 3 of FIG. 3A.

FIG. 6A illustrates one embodiment of the present invention in which the circuit impedances are not equal at each agent.

FIG. 6B shows the waveforms generated at agents 2 and 3 of FIG. 6A.

DETAILED DESCRIPTION

Figure 4A:
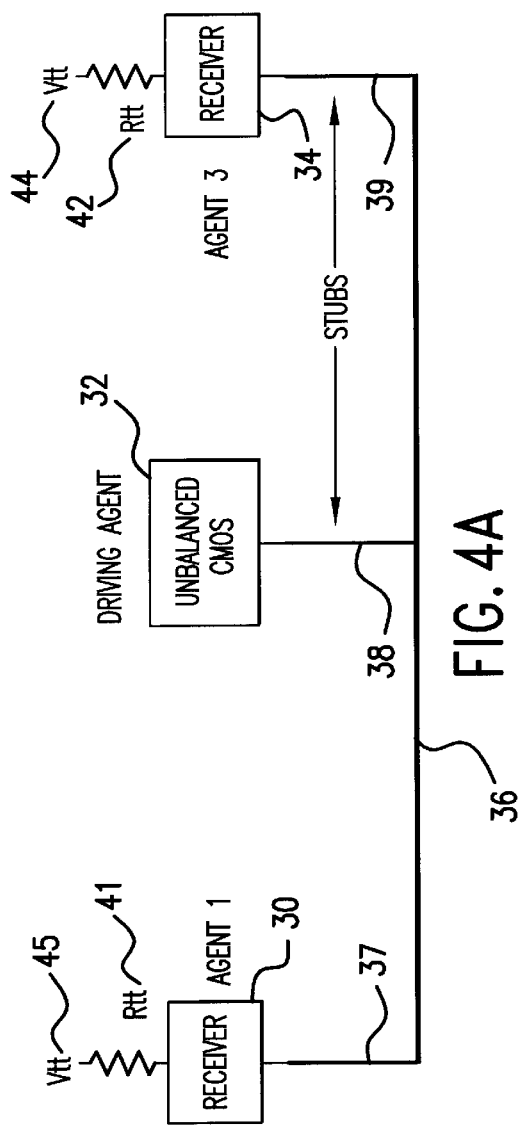
FIG. 4A is a simplified circuit topology of an embodiment of the dynamically terminated bus showing the second agent as the driving agent and all circuit impedances being equal (that is, perfectly matched).

Embodiments of the Dynamically Terminated Bus ("DTB") are described. In the following description, for purposes of explanation, numerous specific details are set forth to provide a thorough understanding of the present invention. It will be obvious, however, to one skilled in the art that the present invention may be practiced without these specific details. In other instances, well known structures and devices are shown in block diagram form. Furthermore, it is readily apparent to one skilled in the art that the specific sequences in which steps are presented and performed are illustrative and it is contemplated that the sequences can be varied and still remain within the spirit and scope of the present invention.

Embodiments of the present invention are described as alternatives to a GTL bus that reduce or eliminate the timing pushouts due to signal integrity problems associated with the traditional GTL topology. The advantages provided by the DTB over existing bus designs include:

Elimination of the stub induced signal integrity problems inherent in a 3-load GTL bus;

Removal of a significant performance bottleneck that is inherent in 3-load GTL busses;

Combining the benefits of a complementary metal-oxide-semiconductor ("CMOS") and a GTL bus;

Allowing system busses to operate at significantly higher speeds; and

Improving performance and reducing system design risk. In addition, the DTB can be implemented in existing systems as a buffer option without jeopardizing the GTL bus solution.

In an embodiment of the present invention, the DTB is a unique hybrid between a GTL bus and a CMOS bus. Specifically, the driver looks like an unbalanced CMOS driver and the receivers look like traditional GTL pull-up terminations. However, unlike the static terminations used in traditional GTL, in embodiments of the present the GTL terminations are dynamic. This means that, in an embodiment of the present invention, the termination pull-up resistors are implemented on-die for an agent and are only active when that agent is not driving the bus. As a result, the present embodiment requires a specific bus protocol which operates according to the following rules:

1. Only one agent is allowed to drive the bus at a time;
2. When an agent is driving the bus, the agent looks like an unbalanced CMOS driver;
3. When the agent is not driving the bus, the agent is pulled up to Vtt via an on-die termination; and
4. On-die termination is required.

Other embodiments are contemplated that do not require on-die terminations.

FIG. 3A shows a DTB bus with 1" long stubs coupling to the three separate agents in accordance with an embodiment of the present invention. Notice, in FIG. 3B, that even though long stubs are present, the signal integrity approaches that of the ideal GTL bus without stubs. The DTB bus is designed to either completely eliminate the stub induced shelves on the rising and falling edges or move the shelves out of the threshold region of concern. It should be noted that the shelves seen on the falling edge are due to a small value of the pull down in the unbalanced CMOS driver and are not considered a signal integrity violation. To compensate for these shelves, the threshold voltage for the receivers is usually set at $\frac{2}{3}$ Vtt.

In accordance with an embodiment of the present invention, the DTB works by eliminating or reducing the reflections caused by the stub by providing a termination of the signal at the stub. It is not adequate to simply place extra pull-ups at each receiver because this will cause problems with the falling edge. The falling edge is dependent on the final steady state DC voltage. If each agent has an Rtt pull-up then the bus will not pull down to an adequate DC voltage. If Rtt is increased to compensate for this problem, then the values of Rtt will not be the correct value to properly terminate the stub. in accordance with an embodiment of the present invention, the DTB allows only 2 Rtt pull-ups to be turned on at one time which eliminates any problems associated with the falling edge. The driver design also eliminates reflections on the bus by adding a P-device pull-up. If the PCB impedance, on-die termination resistance (Rtt) and the P-device pull-up resistance in the unbalanced CMOS driver are exactly matched to the stub impedance, then all reflections will be eliminated and there will be no shelf in the waveform. However, in accordance with an embodiment of the present invention, if these impedances are not equal, the signal integrity becomes dependent on the characteristic impedance of the PCB, the buffer resistance, the stub impedance and the value of Rtt. Therefore, it is important to choose these values so that the shelves will never occur within the threshold region of the buffer. In practice, this is easy to do with realistic values.

FIGS. 3A and 3B illustrate a system in accordance with an embodiment of the present invention and are provided to help explain equations (3) through (10). Equations (3)

through (10) are used to calculate the voltage level of the first shelves that will occur on the rising and falling edges of the waveforms in FIG. 3B for Agent 2 32 and Agent 3 34 in FIG. 3A. FIG. 3A is a simplified DTB circuit topology in accordance with an embodiment of the present invention with agent 1 30 configured as the driving agent and where all circuit impedances are equal (that is, perfectly matched). In FIG. 3A, in accordance with an embodiment of the present invention, agent 1 30 is coupled by stub 37 to transmission line 36. Agent 2 32 is pulled up to Vtt 43 via Rtt 40 and coupled to transmission line 36 by stub 38. Similarly, agent 3 34 is pulled up to Vtt 44 via Rtt 42 and coupled to transmission line 36 by stub 39.

We now derive the equations to predict the voltage level of the first shelf in a DTB bus in accordance with one embodiment of the present invention.

For the rising edge we assume that the circuit shown in FIG. 3A is in the low state, and the circuit has reached a steady state DC level. The steady state DC voltage, VL, and the current, $I_L$, are functions of Rtt, the grounding resistance of the driving agent ("Non") and Vtt as shown in equations (3) and (4).

$$V_L = Vtt \frac{Non}{\frac{Rtt}{2} + Non} \quad (3)$$

$$I_L = \frac{Vtt}{\frac{Rtt}{2} + Non} \quad (4)$$

Therefore, when the bus switches high, Kirchoff's current law can be used to sum the instantaneous current at the driving agent, which results in equation (5).

$$I_L + \frac{Vtt - V_{initial}}{Pon} + \frac{V_L - V_{initial}}{Zs} = 0 \quad (5)$$

Where $V_{initial}$ is the initial voltage induced on the line, Pon is the on-die termination resistance of the driving agent and Zs is the characteristic impedance of the stub. Solving for $V_{initial}$ results in equation (6).

$$V_{initial} = \frac{(Pon)(Zs)}{Pon + Zs}\left(I_L + \frac{Vtt}{Pon} + \frac{V_L}{Zs}\right) \quad (6)$$

In accordance with one embodiment of the present invention, the voltage seen at the receivers is dependent on the impedance discontinuity between the stub ("Zs") and the PCB ("Zo"), and, for simplicity, we assume that the stub impedance is equal to the PCB impedance. Therefore, the signal with a magnitude of $V_{initial}$ will propagate down the transmission line towards the receivers and will encounter an impedance discontinuity at the stub. Assuming matching stub and PCB impedances, the first voltage step seen at the receivers is calculated by equation (7).

$$V_{step,1-rising} = T(V_{initial} - V_L) + V_L \quad (7)$$

Where T is the transmission coefficient seen at the branch of the stub. Assuming, once again, matching stubs and PCB impedances, then T will always be ⅔, as shown by equation (8).

$$T = 1 + \frac{\frac{Zo}{2} - Zs}{\frac{Zo}{2} + Zs} = 1 + \frac{\frac{Zo}{2} - Zo}{\frac{Zo}{2} + Zo} = \frac{2}{3} \quad (8)$$

If Vtt=1.5 volts and Pon=Rtt=Zs=Zo=50 ohms, then all reflections should be eliminated on the rising edge transition and $V_{step,1-rising}$=1.5 volts.

For the falling edge, we assume that the circuit shown in FIG. 3 is in the circuit high state, and has reached the steady state DC level of Vtt. When the driver switches low, the instantaneous voltage on the line can be calculated with equation (9).

$$V_{initial} = -Vtt\frac{Zs}{Zs + Non} \quad (9)$$

This voltage flows toward each of the receivers and the voltage at the receivers is dependent on the transmission coefficients. For simplicity, we assume that Zs=Zo and that the transmission coefficient, T, at the stub is ⅔. Therefore, the voltage seen at the receivers is calculated with equation (10).

$$V_{step,1-falling} = Vtt + T(V_{initial}) \quad (10)$$

If Non=5 ohms, Vtt=1.5 volts and Pon=Rtt=Zs=Zo=50 ohms, then all reflections from the stub will be eliminated on the falling edge transition and $V_{step,1-falling}$=0.59 volts, which is sufficiently far away from the threshold voltage of ⅔ Vtt.

It should be noted that in embodiments of the present invention the best signal integrity is achieved when the pull-up resistance is matched to the stub impedance.

We performed simulations of our design and obtained the characteristic waveforms that we expect for various impedance differences between the system traces and the buffer parameters. These simulations were performed using the circuit design shown in FIG. 5 with 1.0" stubs in accordance with an embodiment of the present invention. In these simulations, Zs was assumed to be equal to Zo and Pon was assumed to be equal to Rtt. Since the Pon will likely be implemented with the same transistors as Rtt in embodiments of the present invention, this is a valid approximation. As a result, we derived a few "rules of thumb" from the results of these simulations. While there are many possible embodiments of this topology that can cause changes in the characteristic behavior of the bus, the following general rules of thumb are applicable to the embodiments of the present invention.

At the end agent:
  When Rtt>Zs; Overshoot will occur on the rising edge and shelves will occur on the falling edge.
  When Rtt<Zs; Ringback will occur on the rising and falling edges.
At the middle agent:
  When Rtt>Zs; Ringback will occur on the rising and falling edges
  When Rtt<Zs; Overshoot will occur on the rising edge and shelves will occur on the falling edge In FIG. 3B, the waveforms at agents 2 and 3 of FIG. 3A are shown. Note that even though the DTB has long stubs, the DTB signal integrity shows the shelves either completely eliminated or pushed outside the threshold region of concern.

FIG. 4A is a simplified DTB circuit topology in accordance with an embodiment of the present invention showing agent 2 32 configured as the driving agent and where all circuit impedances are equal (that is, perfectly matched). In FIG. 4A, agent 2 32 is coupled by stub 38 to transmission line 36. Agent 1 30 is pulled up to Vtt 45 via Rtt 41 and coupled to transmission line 36 by stub 37. Agent 3 is configured as described for FIG. 3A.

Figure 4B:
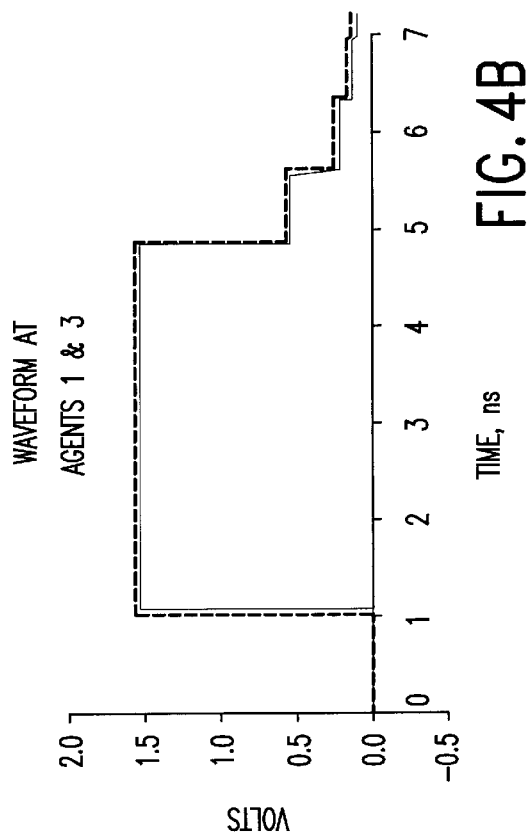
FIG. 4B shows the waveforms at agents 1 and 3 of FIG. 4A.

FIG. 4B shows the waveforms generated at agents 1 and 3 of FIG. 4A. As in FIG. 3B, even though the DTB has long stubs, the DTB signal integrity shown in FIG. 4B still approaches the ideal GTL bus without stubs depicted in FIG. 1A.

Figure 5:
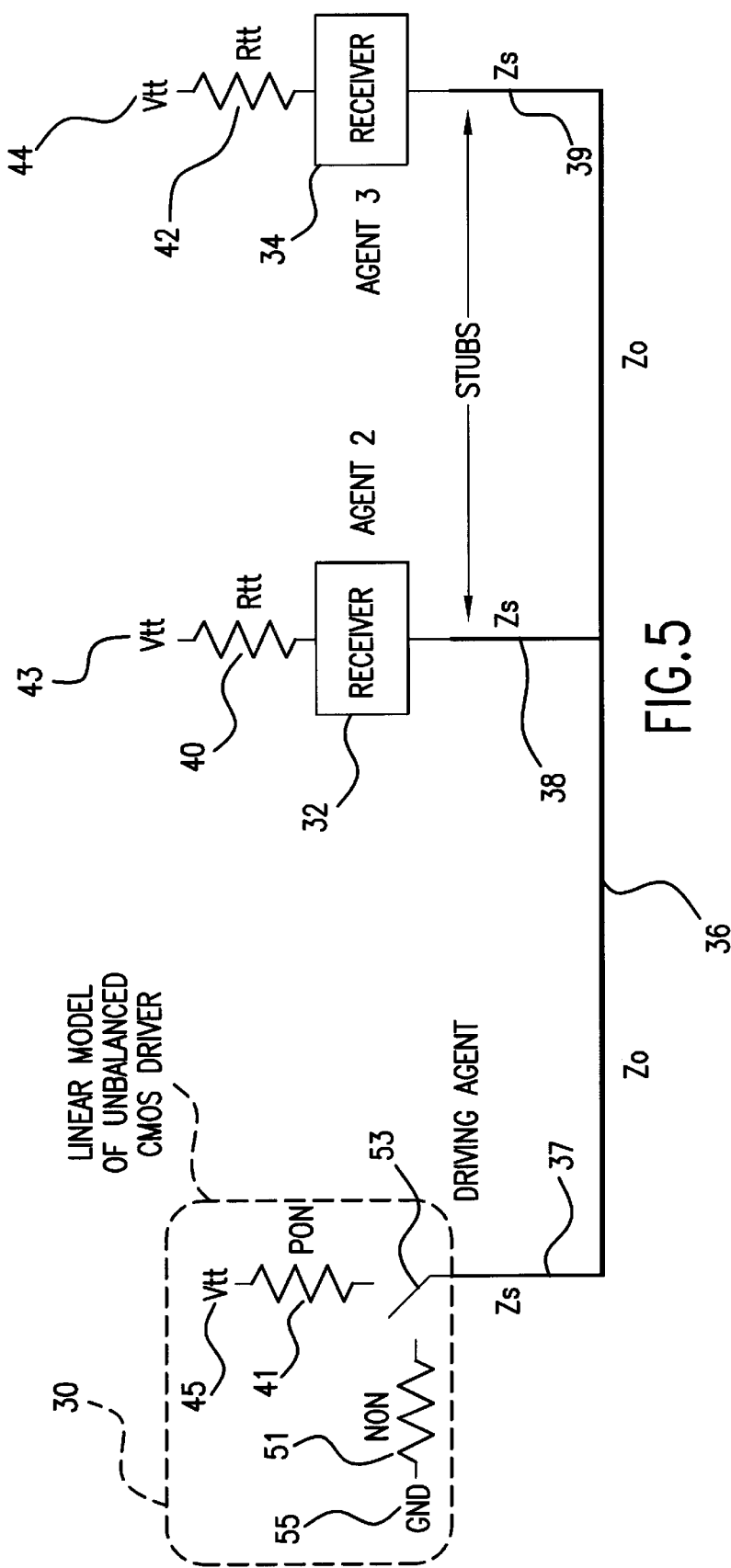
FIG. 5 is a simplified schematic diagram of the topology shown in FIG. 3.

FIG. 5 is a simplified schematic diagram of the topology shown in FIG. 3A in accordance with an embodiment of the present invention. In FIG. 5, in accordance with an embodiment of the present invention, agent 1 30 is the driving agent and is shown configured as a linear model of an unbalanced CMOS driver. Agent 1 30 comprises a circuit having a switch 53 that can be switched to be pulled up to Vtt 45 via Pon 41 or grounded to Ground 55 via Non 51, where switch 53 is coupled by stub 37 to transmission line 36.

FIG. 6A illustrates one embodiment of the present invention shown in FIG. 5 in which the circuit impedances are not equal (that is, not perfectly matched) at each agent. In FIG. 6A agent 1 30 is the driving agent and Vtt for all agents= 1.5V, Pon 41=30 ohms, Non 51=5 ohms, Zs for all stubs=50 ohms, Zo=50 ohms, Rtt 40=50 ohms and Rtt 42=40 ohms.

FIG. 6B shows the waveforms generated at agents 2 and 3 of FIG. 6A. In FIG. 6B, the shelves are still sufficiently far enough away from the switching threshold voltage of the buffer so as not to cause any timing impacts.

A contemplated embodiment of the present invention involves a system with only two agents on the bus, where one agent acts as the driving agent and the other as a receiver pulled up to Vtt. In practice this embodiment exhibits the same performance as a traditional GTL bus.

Yet another contemplated embodiment involves three configurable driving and listening agents and a plurality of listening agents coupled to the DTB, where only one of the three configurable agents can be configured as the driving agent at a time.

Other contemplated embodiments involve implementing the DTB on Multi-Chip Module ("MCM") boards or using a variety of conductor mediums, such as, co-axial cable or standard telephone lines.

It should, of course, be understood that while the present invention has been described mainly in terms of on-die, PCB bus solutions, those skilled in the art will recognize that the principles of the invention may be used advantageously with alternative embodiments involving non on-die terminations, variable numbers of agents, multi-chip modules and coax or phone line connectors as well. Accordingly, all such implementations which fall within the spirit and the broad scope of the appended claims will be embraced by the principles of the present invention.

What is claimed is:

1. An apparatus for implementing a high-speed digital interface, said high-speed digital interface comprising:

a dynamically terminated bus (DTB);

a plurality of dynamically configurable bus components coupled to said DTB; and a dynamically terminated bus protocol operating to control access to said DTB by said plurality of dynamically configurable bus components.

2. The apparatus of claim 1, said plurality of dynamically configurable bus components each being configurable as:

a gunning transceiver logic (GTL) bus component; and a complementary metal-oxide-semiconductor (CMOS) bus component.

3. The apparatus of claim 2, wherein said GTL bus component configuration comprises:

a GTL pull-up termination.

4. The apparatus of claim 2, wherein said CMOS bus component configuration comprises:

an unbalanced CMOS pull-up driver.

5. The apparatus of claim 4, wherein said CMOS pull-up driver comprises:

an on-die pull-up termination;

a ground; and a switch being operable to alternately couple to said on-die pull-up termination and said ground.

6. The apparatus of claim 2, wherein said dynamically terminated bus protocol is characterized by at least the following:

configuring one of said plurality of dynamically configurable components as an unbalanced CMOS driver;

configuring each remaining plurality of dynamically configurable components as GTL pull-up terminations; and permitting said one unbalanced CMOS driver to drive the dynamically terminated bus.

7. The apparatus of claim 5, wherein said GTL pull-up terminations are pulled up to Vtt via on-die terminations.

8. The apparatus of claim 1, wherein said DTB is implemented on a multi chip module (MCM) board.

9. The apparatus of claim 1 further comprising:

a plurality of listening components configured as GTL pull-up terminations and coupled to said DTB.

10. A high speed, dynamically terminated bus for coupling to components, said dynamically terminated bus comprising:

a transmission medium; and a plurality of dynamically configurable components coupled to the transmission medium, each of said plurality of dynamically configurable components being selectively configurable as an unbalanced complementary metal-oxide-semiconductor (CMOS) transmitter and a pull-up termination receiver.

11. The high speed, dynamically terminated bus of claim 10, wherein the transmission medium is selected from the group comprising:

a printed circuit board (PCB);

a multi-chip module (MCM);

a coaxial cable; and a standard telephone line.

12. The high speed, dynamically terminated bus of claim 10, wherein one of the plurality of dynamically configurable components is configured as the unbalanced CMOS transmitter at a time.

13. The high speed, dynamically terminated bus of claim 10, wherein the configuration of the plurality of dynamically configurable components comprises:

a first termination voltage source coupled to an on-die termination resistor;

a second termination voltage source coupled to an n-channel resistor; and a switch coupled to the transmission line, said switch being operable to switch between the on-die termination resistor and the n-channel resistor.

14. The high speed, dynamically terminated bus of claim 10, wherein the pull-up termination receiver configuration of the plurality of dynamically configurable components comprises:
- a gunning transceiver logic (GTL) on-die pull-up termination receiver including:
  - a first termination voltage source coupled to an on-die termination resistor;
  - a second termination voltage source coupled to an n-channel resistor; and
  - a switch coupled to the transmission line, said switch being coupled to the on-die termination resistor.

15. The high speed, dynamically terminated bus of claim 10, wherein the unbalanced CMOS transmitter configuration of the plurality of dynamically configurable components comprises:
- a first termination voltage source coupled to an on-die termination resistor;
- a second termination voltage source coupled to an n-channel resistor; and
- a switch coupled to the transmission line, said switch being coupled to the n-channel resistor.

16. The high speed, dynamically terminated bus of claim 12, wherein the remaining plurality of dynamically configurable components are configured as gunning transceiver logic (GTL) on-die, pull-up termination receivers.

17. The high speed, dynamically terminated bus of claim 13, wherein the first termination voltage is approximately equal to the termination reference voltage.

18. The high speed, dynamically terminated bus of claim 13, wherein the second termination voltage is approximately equal to 0 volts.

19. The high speed, dynamically terminated bus of claim 10, wherein the transmission medium is selected from the group comprising:
- a printed circuit board (PCB);
- a multi-chip module (MCM);
- a coaxial cable; and
- a standard telephone line.

20. A method for controlling the use of a bus by a plurality of components, said method comprising:
- permitting one of said plurality of components to drive the bus at a time;
- configuring said one of said plurality of components as an unbalanced complementary metal-oxide-semiconductor (CMOS) driver; and
- configuring each remaining plurality of components as a gunning transceiver logic (GTL) pull-up termination.

21. The method of claim 20, wherein said configuring each remaining plurality of components comprises:
- pulling said GTL pull-up termination up to a termination voltage source (Vtt) via on-die terminations.

22. A computer-readable medium having stored therein a computer program for controlling the use of a bus by a plurality of components, said computer program comprising:
- permitting one of said plurality of components to drive the bus at a time;
- configuring said one of said plurality of components as an unbalanced complementary metal-oxide-semiconductor (CMOS) driver; and
- configuring each remaining plurality of components as a gunning transceiver logic (GTL) pull-up termination.

23. The computer-readable medium of claim 22, wherein said configuring each remaining plurality of components as a gunning transceiver logic (GTL) pull-up termination comprises:
- pulling said GTL pull-up termination up to a termination voltage source (Vtt) via on-die terminations.

* * * * *